INVENTORS
Harry J. Barnett
and Harry P. Trusty
BY
Ray Belmont Whitman
ATTORNEY.

Aug. 30, 1932.   H. J. BARNETT ET AL   1,874,224
AUTOMATIC SEALING MACHINE
Filed Aug. 6, 1927   5 Sheets-Sheet 3

INVENTORS
Harry J. Barnett & Harry P. Trusty
BY
Ray Belmont Whitman
ATTORNEY.

Aug. 30, 1932.  H. J. BARNETT ET AL  1,874,224
AUTOMATIC SEALING MACHINE
Filed Aug. 6, 1927   5 Sheets-Sheet 4

INVENTORS
Harry J. Barnett & Harry P. Trusty
BY
Ray Belmont Whitman
ATTORNEY.

Patented Aug. 30, 1932

1,874,224

UNITED STATES PATENT OFFICE

HARRY J. BARNETT AND HARRY P. TRUSTY, OF BRIDGEPORT, CONNECTICUT, ASSIGNORS TO McLAURIN-JONES COMPANY, OF BROOKFIELD, MASSACHUSETTS

AUTOMATIC SEALING MACHINE

Application filed August 6, 1927. Serial No. 211,061.

This invention relates to improvements in methods and means for applying adhesive strip material to articles. More especially, it includes an automatic machine for applying a strip of adhesive tape, either treated by heat or water, to a series of folded paper packing boxes to act as a stay or fastening for each box. The operation is entirely automatic, the articles being fed, taped and delivered in quantity at a high rate of speed, and the machine being adapted to apply the tape in any length and at any desired position on the surface of the article, and to treat the tape to make it adhesive—either by the application of heat to special heat-treated tape, or, where water-moistening tape is used, by the application of such moisture thereto.

The invention also is directed to the provision of a new method of treating tape by the application of heat to make it adhesive; a tape applying device adapted to be used without change either for applying heat-treated or water-treated tape; a new method of positively applying a piece of tape to any desired position on an article, and at a high rate of speed, and also severing it in any desired length; and means of feeding and delivering quantities of articles to and from a tape-applying device.

These and other objects of the invention will be apparent as the description proceeds.

All these objects are attained by the methods and means described herebelow and illustrated in the accompany drawings, in which—

Similar numerals refer to similar parts throughout the several views.

Figure 1:
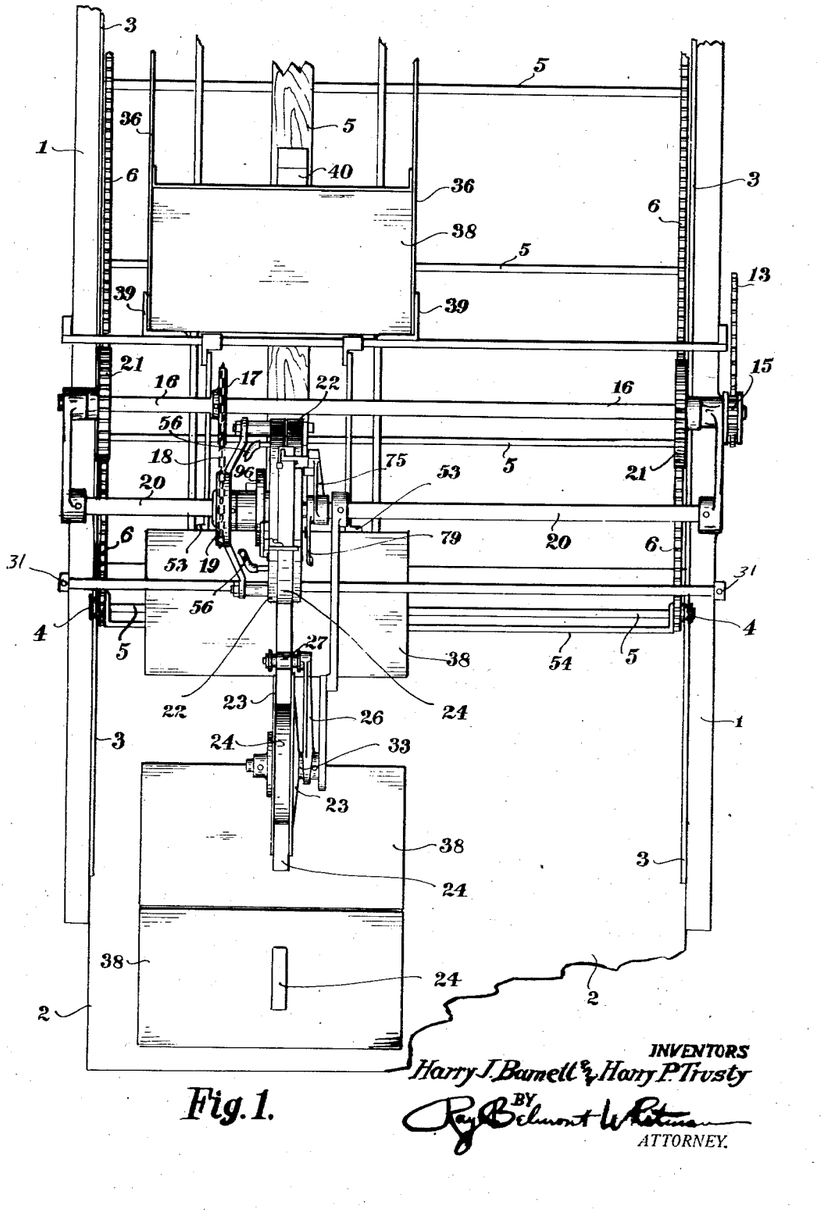
Figure 1 is a top plan view of the main operating features of the completely assembled device, but stripped of certain details to clarify the main disclosure, and showing the articles to which the tape is applied being fed to, processed in, and delivered from the tape-applying member or drum.
Figure 2:
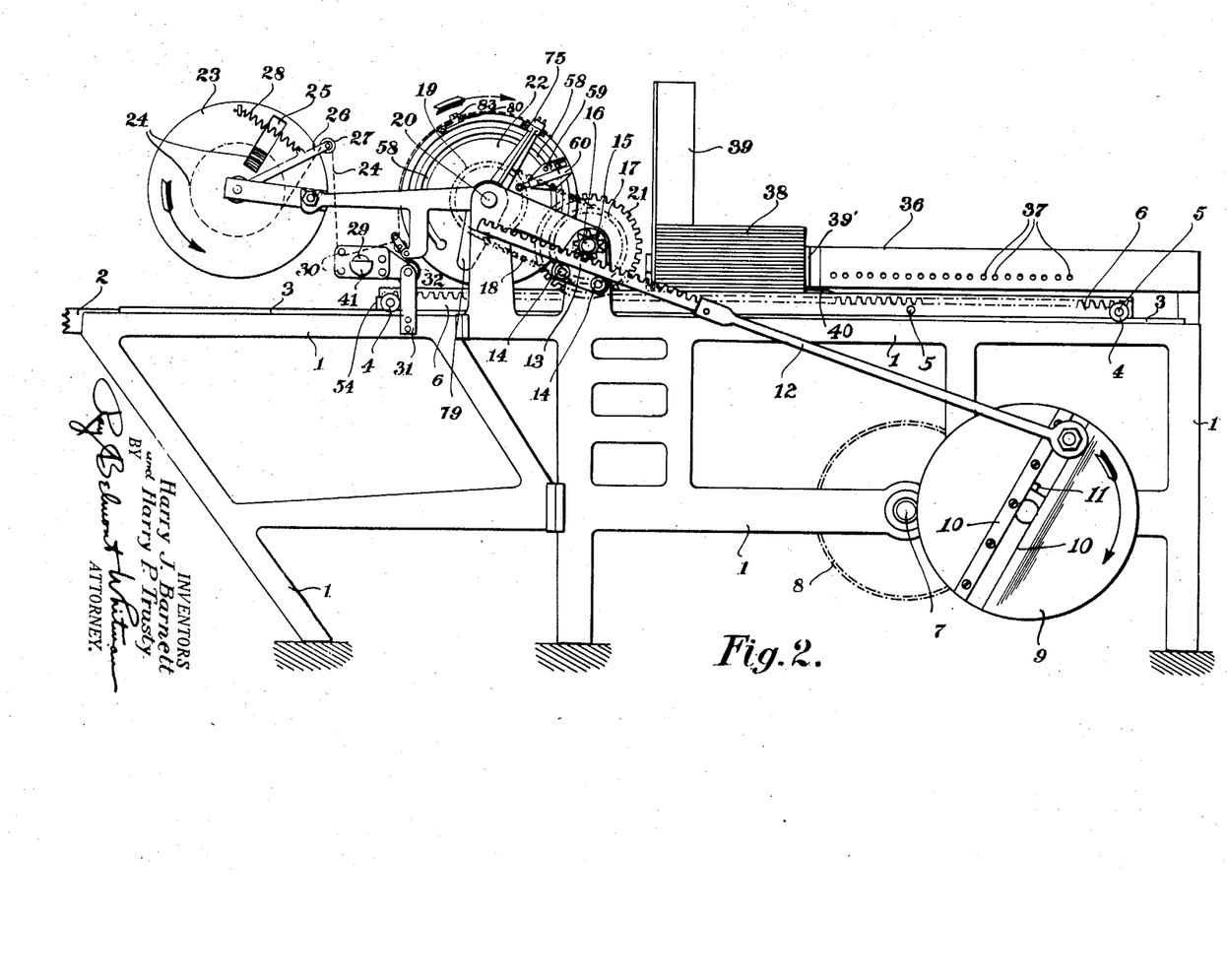
Fig. 2 is a partly-complete side elevation assembly of the machine, showing the power means for reciprocating the carriage on which the paper boxes or other articles are fed to and from the tape-applying drum, and showing also said drum and the tape reel which feeds it.

The machine includes any suitable frame 1, Figs. 1 and 2, comprising uprights or legs supporting a table-top or bed at a convenient height above the floor, this frame being similar to a metal planer bed, only less massive, and formed of structural shapes or iron castings. Frame 1 carries a board top 2, partly covering it.

Secured along opposite sides of frame 1 are parallel horizontal rails 3, along which there is adapted to roll a plurality of small wheels 4, which revolve in, and support, a reciprocating carriage 5, the action being similar to the traveling bed of a metal planer. Secured to the parallel sides of carriage 5, and horizontally positioned thereon, are rack members 6, as shown.

Beneath the carriage 5 and supported in frame 1, Fig. 2, there is preferably positioned a power unit such as an electric motor, (not shown) which rotates a horizontal transverse shaft 7, to which is keyed a gear 8 which in turn drives a pinion (not shown) secured to, and therefore driving, a disk 9 which is also rotatably supported in frame 1. Disk 9 has an enclosing rail 10 secured across its outer face on a diametral line.

A slidable member 11 is arranged within enclosing rail 10 and adapted to pivot as disk 9 is revolved, thus converting the rotary motion of the latter into reciprocating motion. This slide 11 is adjustably attached to the disk 9 with its crank-pin pivotally secured to a link or connecting rod 12 terminating at its upper end in a pivoted rack portion 13, its lower smooth surface being adapted to slide over rollers 14 rotatably supported in a suitable member attached to frame 1, as suggested for instance, in Fig. 2. The upper or rack portion of member 13 meshes with, and oscillates, a pinion 15, keyed to a transverse shaft 16, rotating in a suitable support attached to frame 1, said shaft 16 with pinion 15 being positioned above the reciprocating carriage 4, as shown.

Keyed to shaft 16, and rotating with it, is a sprocket wheel 17, Figs. 1 and 2, which drives, through a suitable chain 18, a second sprocket wheel 19 is mounted to revolve on an adjacent horizontal stationary shaft 20 mounted on suitable supports carried by the machine frame. This sprocket wheel 19 is secured by a spider shown in Fig. 1 to a tape applying drum 22 which thus is compelled to revolve about the axis of the shaft 20 in unison with the sprocket wheel 19.

Keyed also to shaft 16 and rotating with it, are two gears 21 adapted to mesh with, and therefore drive, the rack members 6, and hence the entire carriage 5 with all the parts mounted thereon. Carriage 5 is built up of angle irons and other structural shapes, and its top may be of wood. The gear ratios of the various driving and driven members in the operating system just described are such that the surface of a tape-applying drum 22, which rotates about shaft 20, moves at exactly the same surface speed as does the surface of carriage 4 beneath it.

A suitable chain-tightening device, not shown, of usual construction is provided for the sprocket chain 18.

The tape-applying drum 22 is rotatably mounted over carriage 4 on an elevated support attached to frame 1, this drum being caused to rotate in a vertical longitudinal plane some distance in from either side. In the arrangement shown the frame or bed is made wide enough to mount two of such drums side by side to provide a dual-acting device to double the capacity of the machine.

Mounted on an extension of the support which carries drum 22, and in tandem relation back of it, is a tape supply reel 23, in which a roll of adhesive tape 24 is arranged to freely revolve. This tape may be of a character that will become adhesive on the application of heat, or it may be of the more common variety of water-moistening tape, since the machine is adapted to prepare either kind for adhesion to an article, such as a paper box.

A visibility slot 25 is preferably cut into at least one side of reel 23 to enable the attendant to determine when the supply of tape is becoming exhausted during the operation of the machine.

Tape reel 23 is also provided with a slack take-up device consisting, in the form shown, of a pivoted arm 26 rotatably supporting at its outer end a small pulley 27 over which the tape comes on its way from reel 23 to drum 22. A spring 28 tends to move arm 26 with its pulley 27 always upwardly, this being offset by an opposite pull from tape 24 as it is pulled by drum 22. Spring 28 is of such strength that when in balanced position arm 26 rests normally between the extremes of its possible upward and downward swing, and particularly an appreciable distance from the limit of its upward swing. Now when the tape is being pulled around the surface of drum 22, as hereafter explained, and the movement of the drum is suddenly reversed, the pull on the tape is released, spring 28 draws up arm 26, and so takes up the surplus tape.

This device not only tends to take up the slack tape, but acts automatically as a brake to the continued revolution of the reel 23 when the pull on the tape is released and the feeding of tape is no longer required. This is accomplished by the pivoted end of arm 26 having bevelled surfaces as shown in Fig. 1, these surfaces rotating against a similar bevelled surface on a collar 33 attached to one side or plate of reel 23, (which is transversely slidable along its bearing) and in such manner that the movement of arm 26 will wedge this collar 33 with its plate of reel 23 inwardly against the edge of the roll of tape 24, thus almost instantaneously providing a brake to prevent its continued rotation. Collar 33 is prevented from turning due to the rotation of the reel, by being slidably keyed to its shaft.

The path of the tape, shown by dotted line 24, in Fig. 2, is the path when adhesive tape processed by heat is used. This path is shown from the other side, in full lines, also numbered 24, in Fig. 4. When a tape coated with a water soluble adhesive is used it is necessary to moisten the gummed surface of the tape in order to make it adhesive, and accordingly, the machine is equipped with a water pan 41 in which a roll 29 is mounted. The tape is led from the supply roll 23 over the roll 27 and then down to the guide roll $a$, Fig. 4, thence around the guide rolls $b$ and $c$ and across and in contact with the upper surface of the moistening roll 29 to and around the guide roll $b$, and thence between the rolls 34 and 35 to the drum 22. The gummed surface of the tape runs in contact with the moistening roll 29 and rotates this roll, this arrangement being similar to that used heretofore in machines designed to handle tape carrying a water soluble adhesive.

The water-moistening device just described is positioned immediately above the surface of the article being taped as it passes through the machine, its arrangement in the general assembly being as shown in Fig. 2. It is preferably mounted on a supporting bracket 31 attached to frame 1. Rotatably supported by the same bracket is a holding down roller 32, Figs. 2 and 4, revolving freely on its axis, and adapted to bear on the upper surface of the article being taped to hold it in horizontal position as it emerges from drum 22, after having been taped.

Figure 4:
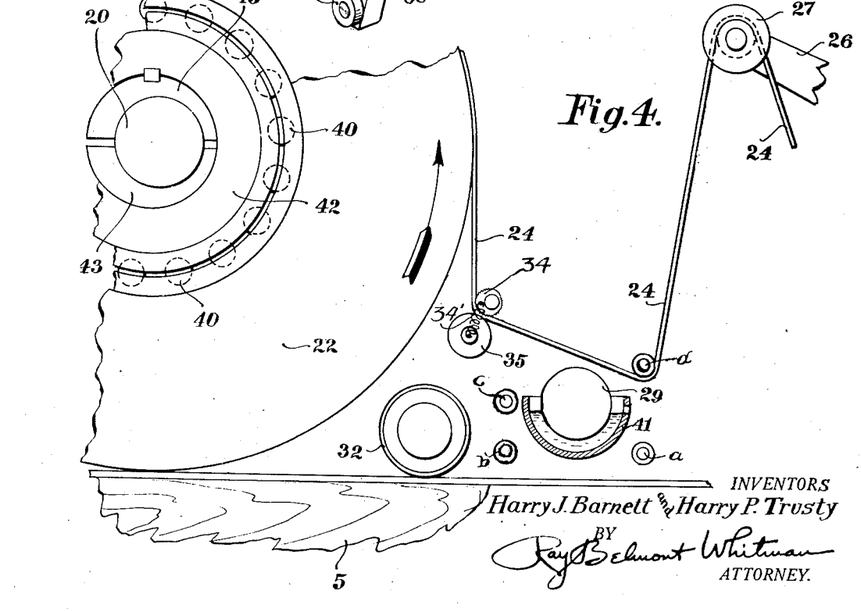
Fig. 4 is a combined diagrammatic and side elevational view, partly in section, showing a fragmentary part of the tape-applying drum in position on the surface of the table, the location of the water-moistening device in relation thereto, and the positioning of the tape between the tape reel and the drum, both when adapted to be treated by heat and by moisture, to make it adhesive.

To prevent the tape 24, on the return stroke, from pulling back off the drum through the operation of the slack take-up device, as previously described, there is provided a small eccentric roller 34, Fig. 4, acting in conjunction with an adjacent concentric roller 35 between which the tape is fed. Roller 34 has a knurled or roughened surface to grip the tape; and it is rotated from an eccentric point such that, during the forward, or feeding and applying, movement of drum 22, the surface of said roller 34 moves away from that of adjacent roller 35, permitting tape 24 to pass freely. But on the reverse movement of drum 22, during the operation of the slack take-up device including the upward return of arm 26, the roughened surface of roller 34 grips the tape and slightly revolves with it, bringing its eccentric larger radius towards the near point of contact with its roller 35, thus effectively jamming or gripping the tape at that point, and preventing further back feeding. Roller 34 normally drops downwardly toward roller 35, either by the action of gravity alone, or with the help of a suitable spring 34'. A suitable coiled spring prevents the continued clockwise rotation of roller 34, and limits it to substantially one-half revolution.

It is desirable to be able to adjust the tape applying drum 22 vertically and for this purpose a split eccentric 43, Fig. 4, is interposed between the drum and the stationary shaft 20 which supports the drum. The drum is mounted on ball bearings 40 held in suitable raceways encircling a collar 42 which is keyed to the eccentric 43. Consequently, by turning the eccentric 43 on the shaft 20 the drum 22 may be raised or lowered to permit the paper boxes, or other articles of varying thickness, to be fed between the bottom of the drum and the top of the traveling carriage on which the articles are reciprocated. In operation, the surface of the drum 22 is utilized to press directly upon the tape, forcing it securely on to the compressible surface of the box. The above adjustment is necessary, therefor, to get the proper tension for most efficient operation on articles of different thicknesses. Any suitable means may be provided for locking the eccentric in its adjusted position. However, in the case of roller 32, arranged as previously explained, it is only necessary to have it resiliently mounted as in spring pressed bearings, so that it will bear down on the box with only a reasonable degree of pressure.

The paper boxes, or other articles to be taped, are supplied from an open frame hopper secured to frame 1 and above the traveling carriage 4, which reciprocates beneath it. This hopper consists essentially of two vertically positioned angle members 39, Figs. 1 and 2, adjustably arranged as shown and adapted to surround the forward corners of the articles to be taped, enclosing side plates 36 to which said angle members 39 are secured and a rear plate 39', Figs. 1 and 2, the side plates 36 having a longitudinal series of holes 37, Fig. 2, to receive bolts for fastening the rear plate 39' in different positions so that the hopper may be adjusted to accommodate cartons or boxes of various dimensions.

A pushing member 40 is adjustably secured to carriage 4 at a central point back of the rear edge of articles 38, when the carriage is in its extreme back position. This member 40 may be adjusted longitudinally along the surface of the carriage to accomodate itself to various widths, longitudinally considered, of the articles 38. Member 40 is of a thickness, or height, somewhat less than the thickness of each article 38 and has usually a straight line forward edge engaging the back edge of articles 38, which edge is usually also a straight line edge, to push the lowermost of said articles forwardly with it as it moves with the carriage toward the taping drum 22. The lower forward surfaces of angle members 39 are cut away a sufficient height from the table top to just permit one of articles 38 to pass under, while yet holding the remaining boxes above from moving with it. This is shown clearly in Fig. 7.

Figures 5, 6, 7:
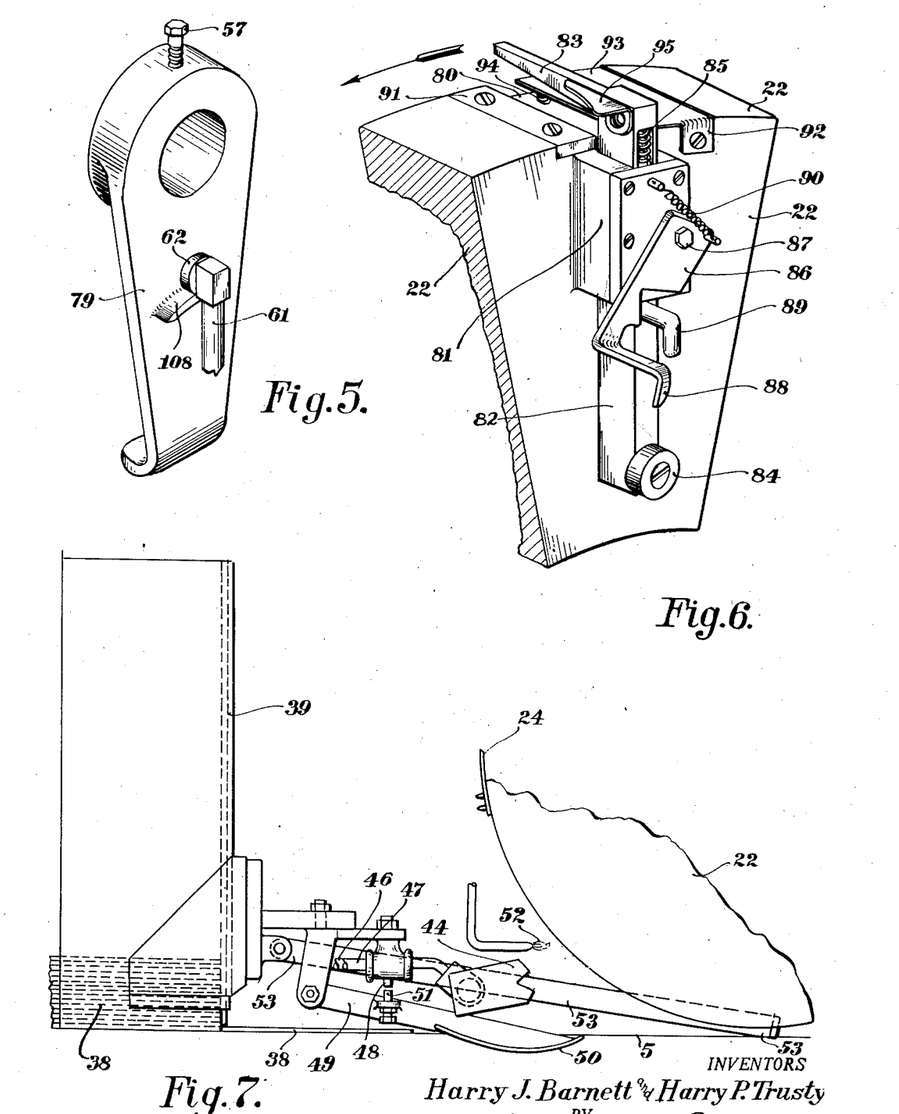
Fig. 5 is a persective view of the arm and cam which actuates the tape-piercing means shown in Fig. 3, the arm being adjustable, by means of a set-screw on the drum shaft, to effect the withdrawal of said piercing means for the tape when same comes in contact with the box or other article to be taped, thus permitting different settings to accommodate a variation in the length of the flaps of said boxes.
Fig. 6 is a fragmentary perspective view of the severing member, or knife, mounted in the tape drum, and showing its operating details, this figure being taken on the opposite side of the drum to that shown in Fig. 2.
Fig. 7 is a side elevational view of the heating member or torch, showing how it automatically operates through the feeding of each box, or other article to be taped, beneath it on the article's journey to the drum, thus momentarily heating the tape on the drum only as required before its application to the article.

When the invention is being used with tape which is made adhesive by heat, the construction shown in Fig. 7 is used to supply this heat, in the manner now to be described.

Attached to a suitable support between the supply of articles to be taped, 38, and the tape-applying drum 22, is a flame nozzle 44 of suitable design, and positioned centrally in the plane of drum 22, and adapted to direct its flame more or less obliquely, as shown, against the tape on the flat-edge surface of said drum. Because of the necessity of a very intense heat for a very short interval of time, this flame is preferably a pressure jet burning a gas such as that known to the trade as "oxy-acetylene", it being supplied, for instance, from a combined gas line 46 and compressed air line 47.

A shut off valve or valves 48 in lines 46 and 47 is adapted to be opened automatically by the movement of box 38 in its journey from its supply hopper or pile to its tape-applying position beneath drum 22. This is accomplished by means of a pivoted arm or feeler 49, having a box engaging face 50 at its lower or free end, and an actuating surface 51, both arranged, as clearly disclosed in Fig. 7, so that the movement of box 38 beneath the face 50, which normally projects below the carriage 5 somewhat as shown, will elevate its pivoted arm 49, and with it its actuating member 51, which in turn operates valve 48, against spring pressure for instance, which normally keeps it closed. With the parts positioned as in Fig. 7, the valve 48 is of course closed, and flame 45 would therefore be absent, but its position is nevertheless indicated for clarity.

Thus the valve is opened, permitting the highly inflammable gas to pass into nozzle 44, and to be ignited by a small pilot light 52 which is always kept burning. In this manner, by arranging these various parts in proper position, the particular portion of the tape 24 on the surface of drum 22 and, which is then to be applied to box 38, is heated to a high temperature in the small interval of time that the box or other article is passing beneath the part 50 of valve actuating arm 49, the valve being so constructed, as suggested above, that after the article has passed and the proper portion of the tape has been sufficiently heated to make the tape adhesive to apply to said box, the flame is instantly put out through cutting off its fuel supply, and only comes on again when needed during the next taping operation. After box 38 has passed from beneath the face 50, after having raised it to open valve 48, arm 49 drops down again to normal position, as by the action of gravity, permitting the spring of valve 48 to close same.

As each article 38 is fed beneath the tape-applying drum 22, and the tape is applied thereto through the action to be hereafter described, the reciprocating carriage 5, on which it rests, carries it beyond drum 22 to a point where its back or following edge has passed the ends of a pair of spaced pivoted (or adjustable) bars 53, Figs. 1 and 7. On the return journey of the carriage 5, the taped articles 38 return with it until stopped by said ends of bars 53, which are set to just clear the surface of carriage 5, but not the edge of articles 38. Carriage 5 then completes its return journey, its forward end returning beyond a point to which one of the articles has been previously pushed by its companions following, at which point said article drops down past the vertical edge 54 of traveling carriage 5, onto a stationary board table-top mounted on frame 1, and from which it is pushed off automatically on the next forward movement of carriage 5, said vertical edge 54, abutting against the backward edge of article 38, or one of its near companions. The relative arrangement of these parts is clearly disclosed in Fig. 1, from above, which shows the supply of articles or boxes at the top of the drawing, one of the boxes being taped beneath the drum 22 and, near the bottom of the drawing, two of the taped or completed articles 38, the lowermost of which will be pushed off the table-top 2 into suitable receiving means through its neighboring article, which in turn is pushed along by the forward edge of the article being taped on the next forward movement of the carriage, which is now as shown in Fig. 1, substantially at its return position.

Tape-applying drum 22, which is positioned in a vertical longitudinal plane to rotate immediately above the top of the reciprocating carriage 5 and around a stationary collar 42, Fig. 4, secured to a stationary shaft 20, and adjustable for height thereon as previously explained, is of a size sufficiently great so that its circumference will be in excess of the greatest width of the articles to be taped as they pass beneath the drum, and having an edge surface sufficiently broad to completely hold the widest tape which it may be desired to apply. This drum 22 may be made of suitable castings, for instance, and is preferably cored out, especially around its peripheral portion, to form water jackets 55, through which a stream of cooling water from a flexible hose connection 56, preferably arranged inside the sprocket wheel 19, can circulate, for the purpose of keeping the tape-applying surface of the rotatably oscillating drum 22 normally cool so as to prevent the premature heat-processing and sticking of the tape 24, whose inner surface next the drum is its non-adhesive surface, until such heat processing is momentarily required just prior to the application of the tape to the article by the drum.

Suspended from stationary shaft 20 along a radius of drum 22, is a cam arm 79, shown in assembled relation in Figs. 1 and 2, and in detail in Fig. 5. Arm 79 has a set screw 57, or like means, to adjustably key it to stationary shaft 20 in any desired angular or radial position. It also has a projecting lip 108, provided with a cammed surface slanting toward its point of support on its inner surface and part way toward its end, as clearly shown in Fig. 5.

Figure 3:
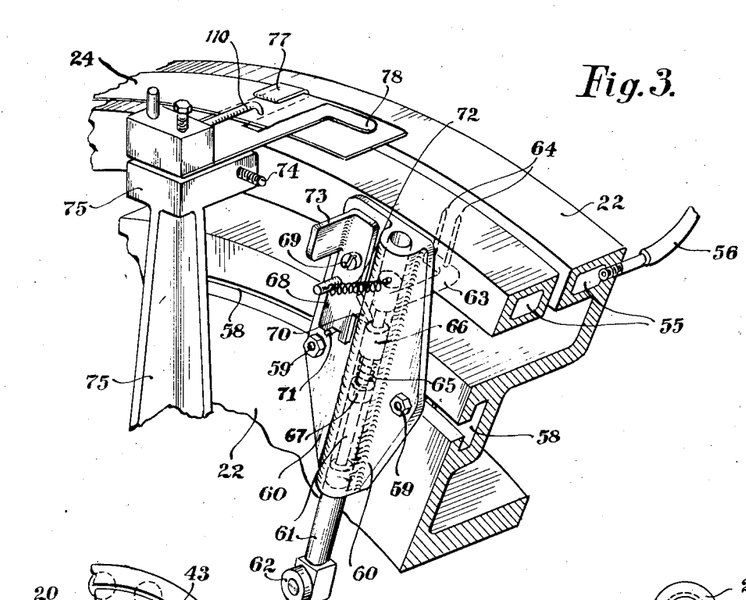
Fig. 3 is a fragmentary perspective view, partly in section, of that portion of the tape-applying member or drum which carries the forward part of each piece of tape to be applied, and showing the details of construction of the tape piercing device which helps to carry the tape around the surface of the drum, also the section of the drum itself with its cooling water jacket, and finally, the device which retains the end of the tape on the surface of the drum and permits it to feed under and past the cutting knife without buckling.

The inner side of tape-applying drum 22 has an annular recess 58, Figs. 2 and 3, extending around a major portion of its circumference between the periphery of drum 22 and its supporting shaft 20. This recess 58 is T-shaped, as shown in section in Fig. 3; and with an enlarged or cut-out portion at one end, as shown in Fig. 2, into which bolt heads may be inserted, their shanks being adapted to slide around the recess 58. Such bolts are shown at 59 in Fig. 3, and they serve to adjustably hold in rigid position along any desired radial line, a plunger casing 60, substantially of the form shown in Fig. 3. Casing 60 houses a rod or plunger 61, mounting at its inner end a revolvable roller 62, and terminating at its outer end in a substantially right-angular projecting arm shown in dotted lines at 63, which in turn supports one or more upwardly-projecting spaced pins 64, the projecting arm 63 being preferably bent as shown to support pins 64 in tandem longitudinal relation. A spiral compression spring 65 surrounds plunger 61 in casing 60 and between a collar 66, fixed to and moving with plunger 61, and a stationary bearing 67.

Pins 64 are pointed or sharpened at their free ends and project in a direction at right angles to the surface of drum 22, and normally remain in a centrally-disposed recess in the center of the edge of the drum, and concealed beneath its surface. Fig. 3 clearly discloses this construction. Plunger 61 is normally held against the compression of spring 65 to retain pins 64 in concealed position beneath the surface of drum 22, by means of a trigger arm 68 swinging from a pivot 69 attached to plunger casing 60. Trigger arm 68 has a pointed finger 70 projecting through a recess in casing 60 against the top or shoulder of moving collar 66 to lock it down against the upward action of spring 65. Inner end of trigger arm 68 has a cut out portion 71 which engages with a projecting pin integral with casing 60 for the purpose of limiting the forward and backward swinging movement of arm 68. Trigger 70 normally tends to assume its locking position, to hold plunger 61 down against the upward pressure of its spring 65, because of the action of a coiled tension spring 72, connecting the casing 60 and arm 68 at a point below its pivot point 69, as shown.

Roller 62, Fig. 3, on the inner end of plunger 61 which moves with drum 22, on the forward stroke after compression spring 65 has elevated pins 64, making them pierce the forward end of the tape to help drag it around with the drum as the latter revolves, finally reaches the position where it meets the cammed surface of projecting lip 108, Fig. 5, on the inside of the stationary arm 79. Plunger 61 is thus forced inwardly to withdraw pins 64 from tape 24 and into their recess in drum 22. At this point the upper shoulder of collar 66 drops beneath trigger 70, which locks above it by the action of spring 72, pulling trigger 70 over with its arm 68.

This concealed position of pins 64 is maintained until trigger 70 is moved out of the way to permit spring 65 to force pins 64 upward again to pierce the next piece of tape to be applied. This releasing of trigger 70 is accomplished through the action of a vertically-projecting lip 73 of arm 68 engaging the end of an adjustable pin 74 projecting from a stationary radial arm 75, on the return stroke of drum 22. For lug 73 is positioned above the pivot 69 and when engaged by pin 74 releases trigger 70 to permit pins 64 to move upward to pierce tape 24 near its forward end.

Stationary arm 75, Figs. 1, 2, and 3, is radially disposed about shaft 20, adjacent the inner surface of drum 22, and is adapted to be adjustably secured to said shaft in any desired angular position. It has a length somewhat greater than the radius of drum 22, its end surface being over and close to the surface of the drum, as shown in Fig. 3. Mounted on this surface, and overlying the edge of the drum, is a tape guide or holder 77, and a projecting tape-holding member 78 with a right angle extension as shown adjacent the position 76 where pins 64 come to pierce the tape 24. In Fig. 3, holes 76 are shown for clarity, although at this point they normally would be absent, since pins 64 have not yet reached the tape to punch it. Member 78, of course, holds the tape from above during this piercing operation. Finger 110, Fig. 3, mounted on arm 75, its point resting on tape 24, is so arranged as to prevent the tape from being drawn out of holder 78 when drum is in reverse motion, while permitting tape to draw freely on its forward motion.

It now remains to describe the automatic operation of the tape-severing member or knife.

The tape-applying drum 22 has a recess cut into its surface in the relative position shown at 80 in Fig. 2. This is shown in detail in Fig. 6, which also shows a housing 81, projecting from the side of drum 22 and adapted to slidably hold a knife-supporting bar 82 terminating at its upper end in a tapered knife or severing member 83, which is secured to bar 82 at right angles thereto, and projects across the surface of the edge of drum 22. The inner end of bar 82 carries a revolvable roller 84. Bar 82 with its attached parts including knife 83, normally tends to assume its upper or open position, above the surface of the edge of drum 22, through the action of a compression spring 85 positioned in a hollow upper section of bar 82, its lower end bearing against the inner projecting end of bolt 87, which rides in a longitudinal groove in bar 82, and its upper end against the upper portion of bar 82. Secured to housing 81 is a trigger arm 86, pivoted at 87, and formed with a double notch, substantially as shown in Fig. 6, and terminating in a right-angle hooked portion 88. Projecting from the side of bar 82 approximately midway of its length is a hooked pin 89, its shank being adapted to pass into the lowermost of the two notches formed in 86 to hold knife 83 down against the upward force of compressed spring 85 during the interval between successive tape-cutting operations. A tension spring 90 is arranged as shown to normally urge trigger arm 86 into position to lock knife 83 in its down or closed position, after having been moved to such position through the camming action of roller 84, as later described.

The near or facing side of knife member 83, as shown in Fig. 6, is its flat side, the opposite side being bevelled to form a knife edge, which slides past the edge of the hardened and ground cutting-off edge member 91 affixed to one edge of recess 80 in drum 22. Projecting toward member 91 across recess 80 and pivoted from near its opposite side by means of lugs 92 is a flat plate member 93, its back or pivoted edge being flush with the edge surface of drum 22 and its forward edge being adapted to be compressed slightly beneath said edge surface through the downward movement of the tape over it when being cut, but normally tending to move back into or slightly above the plane of said edge through the action of a compression spiral spring 94. Member 93 serves to prevent the tape from catching on knife edge 91 when the drum 22 is reversed in direction after a previous cutting off of the tape. For it helps to hold up the tape, permitting it to pass over this knife edge 91. Attached to knife 83, and in form and position as shown in Fig. 6, is a flat tape-holding finger 95 adapted to hold the end of the tape down on to the edge surface of drum 22, and over member 91, after knife 83 has completed its cutting operation and is in the down or closed position, and until such time as knife 83, which carries this finger 95, is raised.

Figure 10:
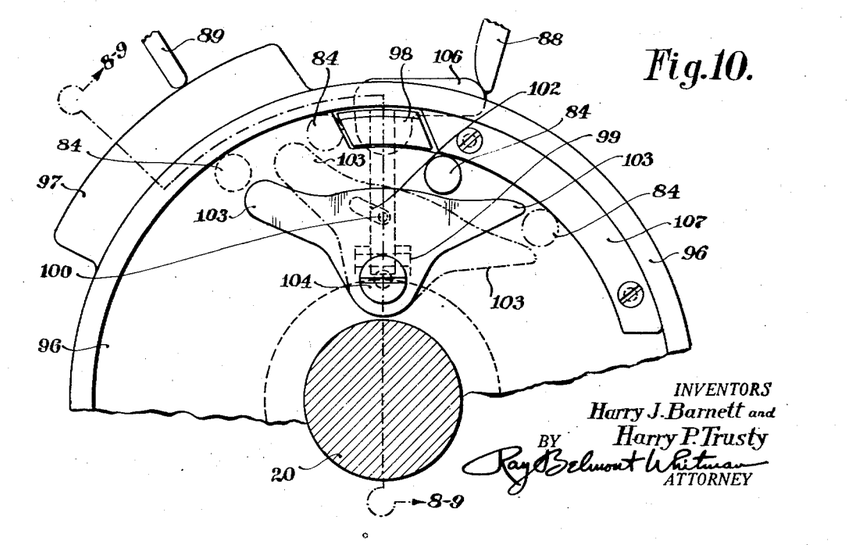
Fig. 10 is a side elevational view of the knife-operating stationary cam positioned adjacent the outer surface of the tape-applying drum, and showing further details of the cam construction.

Secured to stationary shaft 20, about which tape-applying drum 22 revolves, and adjacent the outer side of the latter, is a stationary more-or-less circular cam member 96, Fig. 10. Cam 96 has an external cam portion 97 projecting outwardly from one portion of its periphery, as clearly shown in this figure. Also, in somewhat the relative position shown in the same figure, there is an internal cam-member 107 mostly of concentric circular contour along its inner or cammed surface and secured to the inner or drum-facing side of stationary cam 96 along a portion of its periphery. A portion 98 of this cam 107 is divided as shown, and later explained.

Figures 8, 9:
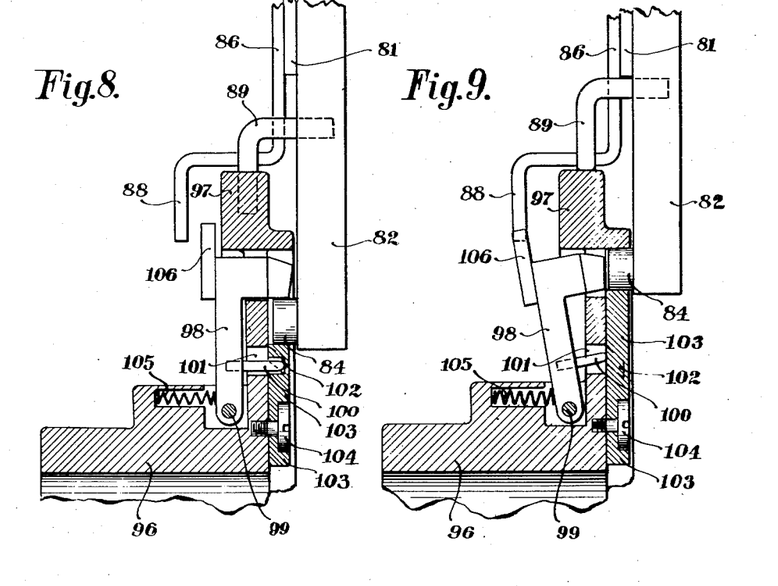
Fig. 8 is a sectional view through the planes of lines 8, 8—9, 9 of Fig. 10, and showing the operating cam parts which, with the mechanism shown in Fig. 6, operate the severing member or knife mounted in the tape drum, the various parts being shown in the positions they assume during the forward movement of the tape-applying drum, when the cutting operation takes place.
Fig. 9 is a view similar to Fig. 8, but showing the various parts in the positions they assume during the return movement of said drum.

The relation of the knife mechanism shown in Fig. 6 and its actuating mechanism shown in Figs. 8, 9, and 10, when the various parts are assembled in operative relation, is shown by the position of bar 82 and (or) its roller 84 in these several views. In Fig. 10, the various positions of roller 84, in its cam-actuating journey across the surface of stationary cam 96, is shown, the bar 82, omitted from this view, being normally position on the upper or near side of cam 96, as viewed in this figure.

The position of the various parts for the operation of cutting the tape, that is, moving the knife 83 into closed position, is shown in Fig. 8; the position these parts assume during the return operation is shown in Fig. 9.

Stationary cam 96 has mounted within it, in the manner clearly disclosed in Figs. 8 to 10 inclusive, a disappearing cam 98, this cam being pivoted laterally at 99 and carrying a knock-out pin 100, projecting through a slot 101 in the side of cam 96, the end of which pin 100 sometimes rides in a beveled recess 102 in a butterfly cam 103, pivoted at 104 into the opposite face of stationary cam 96. Disappearing cam 98 is normally held in its closed position as shown in Fig. 8 by means of a spiral compression spring 105, positioned somewhat as shown in Figs. 8 and 9, a pocket being provided for it in the body of stationary cam 96. This cam 98 also has a projecting portion 106 substantially of the shape shown in Figs. 8 to 10 inclusive.

The approximate contour of butterfly cam 103, in the form here disclosed, is shown clearly in Fig. 10.

During the cutting operation of the tape by knife 83 through the inward movement of bar 82 together with its roller 84, this roller 84 also moves with the drum 22 across the surface of the immediately adjacent stationary cam 96 from left to right, as viewed in Fig. 10. The position the roller assumes during this passage is clearly shown. Roller 84 passes the cam end of disappearing cam 98, which projects through the slot in stationary cam 96, and cam 98 tilts inwardly to the position shown in Fig. 9, as hereafter explained. At this moment the tape 24, Fig. 3, has just passed beyond the end of the guiding and holding-down fingers 77 and 78. Now roller 84 moves farther to the right, as shown in Fig. 10, and engages the top of the raised portion of butterfly cam 103, tilting it to the right towards the position it finally assumes as shown in dot-dash lines in that figure. This axial movement of butterfly cam 103 from its solid line to its dot-and-dash line position as shown in Fig. 10, results also in a laterally-pivoting movement from the position shown in Fig. 8 to that shown in Fig. 9. This is brought about by the pin 100 attached to cam 98 being pushed with said cam to the left of the position shown in Fig. 8, into that shown in Fig. 9, through the action of the beveled slot 102 in butterfly cam 103, so that at the end of such movement, the end of pin 100 is riding on the unslotted surface of butterfly cam 103, whereas, at the beginning of the movement, when in position shown by the solid lines of butterfly cam 103 in Fig. 10, it rested in the deepest part of said slot 102. This movement is continued until the surface of the projecting end of cam 98 is flush with the side surface of cam 96. When in this outward position as shown in Fig. 9, on the back or return stroke, the projecting part 106 of disappearing cam 98 passes into engagement with the hook member 88, Figs. 6 and 9, thus pressing it to the left as shown in Fig. 6 and out of the lowermost recess of pivoted cam member 86, so releasing the catch which holds knife 83 down in its closed position by means of pin 89 having been held in said lowermost notch; and permits bar 82 with its knife member 83, now released from said catch, to raise through the action of compression spring 85. The time at which this operation is begun and finished may of course be controlled by the position of the several cam elements, and is in keeping with the sequence of operation of the machine as hereafter described more generally.

The actual operation of cutting is of course accomplished by the downward movement of roller 84 being cammed inwardly along the surface of the disappearing cam part 98 pivoted to stationary cam 96, and which is at that time in exposed position as shown in Fig. 8.

During this portion of the travel of roller 84, it will be noted that roller 84, which normally is held by spring 85 to roll up against cam edge of 96, as shown in Fig. 10, clears the end of the butterfly cam 103, moves around the now-exposed edge of sectional or disappearing cam 98, and at this point, during the cutting operation, because the contour of the central portion of cam 103 is parallel to the opposite or facing edge of cam 98, no movement of cam 103 results. But immediately after roller 84 passes the end of cam 98, it begins to engage cam 103, tilting it finally to the dot-dash line position shown.

Now, on the return stroke, the roller 84 hides along the cammed surface of cam 107, and with cam 98, which projects through the slot, now out of position and flush with the surface of the cam, as shown in Fig. 9, the roller 84 rides around the end of cam surface 107, and over the face of the now flush surface of cam 98. At this position, the hook 89 attached to the operating bar of the knife reaches the end of projecting cam surface 97 and rides up over its top, thus positively opening the knife. A short distance beyond this point, roller 84 engages with the butterfly cam 103 which is now in the position shown by the dot-dash line, and as its movement continues, it swings this again to the left towards the original position as shown in solid line; and with this movement, it returns the disappearing cam 98 to its original cutting position through permitting the pin 100 to return into the slot in the butterfly cam thus moved.

The length of this sectional or disappearing cam 98, as shown in Fig. 10, permits the release of knife 83 slightly ahead of the return stroke, so that the knife will have time to get out of the way and not go under the tape.

The general operation of the whole machine will now be described.

The traveling carriage is at its full back stroke and the boxes to be taped are piled in the hopper as shown. The tape-applying drum which carries, measures, and cuts the tape, and finally applies it to each box, is also at its full back stroke, at which point the mechanism previously described has operated to release the disappearing pins from their concealed position, and permit them to press outwardly and pierce the tape to carry it forward with the drum on its forward journey. These pins recede as soon as they have brought the forward end of the tape on to the box or at approximately the lowermost point of the drum travel or slightly past said point, as desired. This action of pins 64 is adjustable, by loosening set screw 57, Fig. 5, and swinging arm 79 to a new position, where cam 108 will operate rod 61 to withdraw pins 64, Fig. 3, at any desired point.

As the machine is started, the carriage moves forward, carrying along the lowermost box in the pile. At the same time, and with the same speed, the drum moves around its center, forwardly in the direction of the arrow, carrying the tape with it and placing the forward end of the tape in proper position on the box, (which has by then traveled to a position beneath the drum) at a distance removed from one side of the box as required, this position being, of course, within the inside edge of the folding flap of the box.

As the tape has moved around with the drum, it has been momentarily heated by the temporary gas flame projected against it, this being automatically started and stopped in the manner heretofor described. The flame softens the adhesive which is on the outer surface of the tape away from the drum, and in direct contact with the flame.

After being properly processed, or softened to an adhesive condition by this heat, the tape is then pressed on to the upper surface of the box through the pressure of the drum itself, this pressure having been regulated previously to any desired amount, and for different thicknesses of board, in the manner heretofore explained.

The knife having previously been set, by proper adjustment of its operating cam members, to cut the tape at the required time, the knife-actuating roller comes in contact with the disappearing cam, draws the knife down and cuts the tape. The end of the tape is held down by the small spring finger 95, Fig. 6, until the tape is placed on the box. This forward stroke is less than one complete revolution.

The knife is thereafter positively held down in closed position, by means of the locking mechanism previously described, until the latter is disengaged, which occurs almost at the end of the return stroke, which next takes place, both the carriage and the drum being reversed in movement. However, on this return stroke, as the roller passes the disappearing cam, which has now moved out of the way, so that it is flush with the surface of the stationary cam through which it projects, the roller thus reaching the end of the cam rail sooner, allows the knife to open somewhat sooner on the return stroke, than it did in closing on the forward stroke, this action being necessary to give the knife enough time to get up out of the way of the tape, permitting the latter to slide under it on the return, ready for the next cutting operation.

On this back stroke, through the action of the butterfly cam as previously explained, the disappearing cam is again set in position to be ready once more to draw the knife down again when the next forward stroke occurs.

The box, having been thus taped, passes along over the carriage top, and on the return of the carriage, returns with it until stopped by the projecting bars as previously explained, to be pushed on the next forward stroke, by its following companion(s), and finally, dropping off the table, and, for instance, into a suitable supply bin; and the carriage returns, picks up another box, and the operation is repeated at a high rate of speed as long as the material supply lasts and the power is on.

The length of travel of the carriage may be altered to accommodate various widths of boxes or other articles, by shifting the eccentric throw of rod 12, as by moving the slide 11 toward or away from the center of revolvable disc 9. To accomplish this without affecting the relative positions of the other operating parts, rack portion 13 may be first disengaged from its pinion 15; or drum 22 may be temporarily disconnected from its drive to permit pinion 15 to rotate to effect the above change without moving the drum. This last may be accomplished by loosening the set screw between sprocket 17 and its shaft. Likewise pinion 15 is removed from engagement with rack 13 by loosening the set screw which fastens it to its shaft 16, and then sliding the pinion off this shaft. The pushing member 40 is, of course, shifted to proper position behind the boxes, but it is desired to limit the carriage travel, as above, to just enough to carry member 40 behind any particular width of box to be taped. Pushing member 40 is adjustably held to the carriage by a wing nut connection, not shown, or equivalent construction, which clamps it to the carriage at any desired point.

The distance between knife 83 and arm 75, as shown in Fig. 2, determines the length of tape cut. Arm 75, by being adjustable toward and away from knife 83, permits pieces of tape of any length that might be needed to be applied to the boxes. The time at which this cutting takes place is determined by the adjustment of the cam member 96 on the shaft 20, this member carrying the various cam elements which operate the knife, as above explained.

And the releasing of the driving connection (i. e. sprocket 17) between drum and carriage, to permit the latter to be moved forward or backward without the drum also revolving, permits both these essential parts to be set in such relation to each other that the tape will be applied to the boxes at any desired distance inwardly from their forward edges. This relative re-positioning of the parts may also be effected in conjunction with a shifting of the location of arm 75, which alters the position of the forward end of the tape, to bring about any relative positioning between tape and box.

The relative position of stationary arm 75, and the tape-gripping part 60, Fig. 2, must be such that at the full back stroke, they will just come together—that is, parts 73 and 74, Fig. 3, will just engage to trip the pin locking mechanism to permit the tape to be again pierced at the beginning of the next operation. This adjustment is effected by loosening bolts 59—59 to permit swinging movement of part 60 with its attendant parts, relative to part 74.

It is to be understood that the present disclosure is for the purpose of illustration only, and that the invention is not limited thereto. To those skilled in the art, many modifications of the invention will be readily apparent, and many steps added to the novel methods disclosed, and it will also be obvious to such skilled persons that parts or methods may be used without other of the parts or methods thereof, many such combinations readily suggesting themselves. Therefore, it should be, and is to be distinctly understood that for a definition of the limitations of the invention, reference must be had to the appended claims.

Having now described the invention, what is claimed as new, and for which Letters Patent of the United States is desired, is:

1. The combination with a device for applying tape to articles, of means for heating the tape, said means being controlled by the movement of the article through the device.

2. In combination, a tape-applying drum, tape severing means thereon, and means including a stationary cam adjacent the drum for actuating said severing means on rotation of the drum.

3. In combination, tape-applying means, and independent tape-piercing means operable by the latter for positively feeding the tape.

4. Taping means, including a rotatable member, tape-severing means thereon adapted to be actuated through the rotation of said member, other means engaging the tape to carry it around said member, and cam means adapted to actuate said severing and carrying means in proper sequence.

5. In combination, a tape-severing member, a rotatable tape-applying member carrying said severing member, cam means for actuating the severing member to cut the tape during a forward rotation of the tape-applying member, and means for returning said severing member during the backward rotation of the tape applying member to a position in readiness to cut the tape again.

6. In combination, rotatable tape-applying means, tape-severing means carried thereby, cam means for closing said tape-severing means, and locking means for retaining said tape-severing means in closed position, said severing means and locking means being actuated during the rotation of the tape-applying means.

7. In combination with an automatic sealing machine, tape-supply means, tape-applying means fed thereby, means for reversing the movement of said tape-applying means, and means for preventing the return of slack tape from the tape-applying means to the tape-supply means during the non-feeding movement of the former.

8. In combination with an automatic sealing machine, tape-applying means having a non-feeding return movement, a tape reel, means for intermittently feeding the tape therefrom during the feeding movements of said means, and means for taking up the slack tape after each feeding movement.

9. The invention as in claim 8, including means for braking the rotation of the reel after the feeding movement.

10. In a machine of the class described having in combination a tape applying drum, severing means thereon, and means for rendering said tape adhesive.

11. The method of applying tape to an article including heating the tape to make it adhesive, positioning the tape around the surface of a rotatable tape applying means, bringing said means in operative relation to the article to be taped, and then exerting pressure between said means and said article to transfer the tape to the latter, the adhesive surface of the tape being between it and the article.

12. In a machine for applying sealing tapes to cartons, comprising a tape carrier, and means for supporting the cartons in operative relation to the tape carrier and for turning the tape carrier and producing relative translational movement between the tape carrier and the cartons, a blow-pipe burner for heating the tape on the tape carrier, means for supplying said burner with fuel gas and with oxygen to support combustion, valve means controlling the separate gases for the heating flame, and means controlled by the cartons for operating said valve means.

13. A blowpipe designed to operate with a mixture of a fuel gas and oxygen in an apparatus in which pieces of work are fed intermittently embodying, a pilot to ignite the working flame, valve means for turning on and shutting off the separate gases for the working flame, a feeler adapted to contact with pieces of work, and an operative connection between said feeler and said valve means.

14. In a machine for applying tape coated with a meltable adhesive to boxes and other articles, the combination of tape feeding and applying means including a drum having a tape carrying peripheral surface, mechanism for feeding the articles to which the tape is to be applied past and adjacent to the periphery of said drum, and means for heating the tape on said drum while the tape is carried toward the article to which it is to be applied.

15. A machine according to preceding claim 14 having means arranged to be operated by the feeding of said articles into taping position for automatically controlling the operation of said heating means.

16. In a machine for applying tape coated with a meltable adhesive to boxes and other articles, the combination of mechanism for feeding, in a substantially predetermined path, the articles to which the tape is to be applied, means for guiding the tape to the articles so fed, said means including a drum having a tape carrying peripheral surface, means for heating the tape while it is on said drum, and mechanism for controlling the operation of said heating means automatically in response to the demand for said tape.

17. In a machine for applying tape coated with a meltable adhesive to boxes and other articles, the combination of mechanism for feeding, in a substantially predetermined path, the articles to which the tape is to be applied, a reel for holding a supply of said tape, a drum over the periphery of which the tape is drawn from said reel, mechanism for giving said drum a tape feeding movement, means associated with said drum for guiding the tape over the periphery of said drum and toward said articles, and means for heating the tape on said drum as it is carried toward the article to which it is to be applied.

18. In a machine for applying tape coated with a meltable adhesive to boxes and other articles, the combination of mechanism for feeding, in a substantially predetermined path, the articles to which the tape is to be applied, a reel for holding a supply of said tape, a drum over the periphery of which the tape is drawn from said reel, mechanism for giving said drum a tape feeding movement in timed relationship to the operation of said article feeding mechanism, means associated with said drum for guiding the tape over the periphery of said drum and toward said articles, devices for engaging the tape between said reel and said drum including a slack takeup, and means for heating the tape on said drum as it is carried toward the article to which it is to be applied.

19. In a machine of the character described, the combination of means for progressively applying tape coated with a normally non-tacky heat plastic adhesive to articles of work, means for heating the adhesive on said tape to make it tacky preparatory to such application, and mechanism for controlling said heating means by the movement of the articles through the machine.

20. In a machine for applying tape coated with a normally non-tacky heat plastic adhesive to boxes and other articles of work, the combination of mechanism for feeding said articles in a substantially predetermined path, means for guiding the tape into contact with the articles so fed, said means including a drum having a tape carrying peripheral surface, means for heating the tape to make said adhesive sticky preparatory to applying the tape to said articles, and means for automatically cutting the tape so fed into predetermined lengths.

21. In a machine for applying tape coated with a normally non-tacky heat plastic adhesive to boxes and other articles of work, the combination of mechanism for feeding said articles in a substantially predetermined path, means for guiding the tape into contact with the articles so fed, means for progressively heating the adhesive on the tape to make said adhesive sticky preparatory to applying the tape to successive articles, and mechanism operating in timed relationship to the movement of said articles through the machine for automatically cutting the tape to sever a predetermined length of the tape suitable for application to the respective articles.

Signed at New York, in the county of New York and State of New York, this 15th and 22d days of March, A. D. 1927.

HARRY J. BARNETT.
HARRY P. TRUSTY.